April 3, 1956   C. J. H. MONK   2,740,290
ROCKER-TYPE APPARATUS FOR MEASURING THE HARDNESS OF SURFACES
Filed Dec. 15, 1953

INVENTOR
Cyril James Henry Monk

BY
Cushman, Darby & Cushman
ATTORNEYS

United States Patent Office 2,740,290
Patented Apr. 3, 1956

2,740,290

ROCKER-TYPE APPARATUS FOR MEASURING THE HARDNESS OF SURFACES

Cyril James Henry Monk, Bourne End, England, assignor to Imperial Chemical Industries Limited, a corporation of Great Britain Application December 15, 1953, Serial No. 398,381

Claims priority, application Great Britain December 17, 1952

8 Claims. (Cl. 73—78)

The invention relates to apparatus for measuring the hardness of surfaces, and more particularly to a hardness tester of the rocker type, as exemplified in United States Patent No. 1,935,752 to Sward.

A Sward-type rocking instrument for measuring the hardness of surfaces, particularly of paint films, comprises two identical flat metal rocker arms, in the form of discs or rings, connected side by side by spacer elements and having a weight mounted eccentrically therebetween. In some constructions the distance of the weight from the axis of the rings can be adjusted to vary the period of oscillation of the instrument. When such an instrument is set rocking on a surface, the amplitude of its motion will decrease and will eventually reach zero when the rocker comes to rest, the rate of decrease in amplitude being a measure of the hardness of the surface.

In actual practice, the number of swings of the instrument in which the amplitude decreases from a predetermined high limit to a predetermined low limit is used as a measure of surface hardness, the count of the swing usually being made mentally by an operator. In one type of construction the amplitude limits are determined by means of two spirit level indicators mounted on the instrument at two different angles. The two angles are such that when the instrument is at the extreme point of a swing and one or the other of the indicators is level, the instrument is then at the beginning or end of the range of amplitude on which the count is being made. In another type of construction the limits are determined by means of a pendulum type of indicator mounted on the instrument.

The amplitude-determining procedure may be modified by using a mechanical device to set the instrument rocking with a predetermined initial amplitude, but the observation of the predetermined low amplitude is still made on a spirit level or a pendulum-type indicator attached to the instrument. Of course, reading a spirit level or a pendulum-type indicator while in motion is difficult. Furthermore, the nature of the observations in general is such that they are considerably influenced by operator fatigue.

Accordingly, it is an object of this invention to provide a rocker-type hardness tester with means for counting the number of oscillations of the tester between predetermined limits of amplitude.

It is another object of the invention to provide a rocker-type hardness tester with simple built-in means responsive to oscillations of the tester for counting the oscillations thereof between predetermined limits of amplitude.

It is a further object of this invention to provide a rocker-type hardness tester that meets the foregoing objects and in which the counting means is responsive only to oscillations of greater than a predetermined amplitude.

Other objects and advantages of the invention will be apparent from the following description and accompanying drawings, in which.

Figure 1:
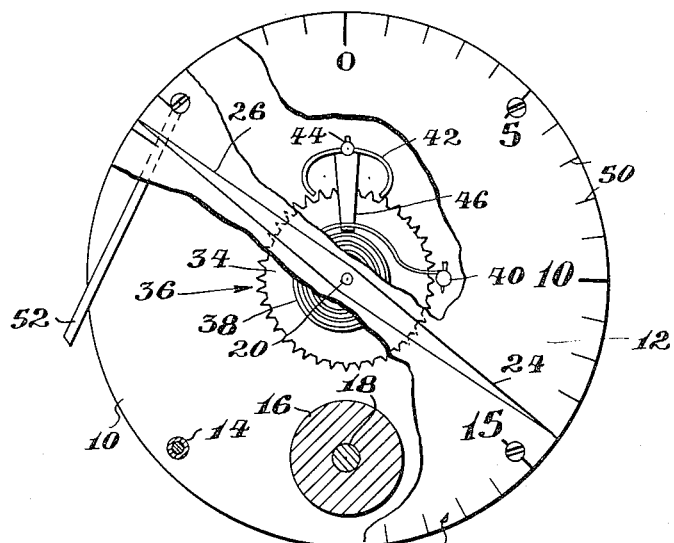
Figure 1 is a front elevational view of a rocker-type hardness tester embodying this invention, the tester being shown in its position of rest and with parts broken away to illustrate details.
Figure 3:
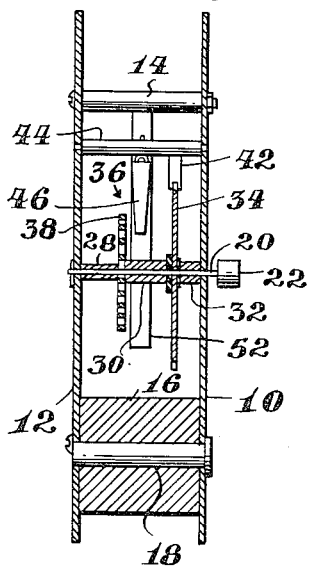
Figure 3 is a vertical sectional view taken on line 3—3 of Figure 1.

Referring now to the drawings, the instrument comprises two identical flat wheel-like metal discs 10, 12 that constitute rocker arms and are connected together by spacer bars 14. A weight 16 is mounted eccentrically between the discs 10 and 12 on a transverse pin 18. Coaxially journalled in the discs 10 and 12 is a spindle 20 having an outer winding knob 22 secured to one end thereof and an outer indicator arm or pointer 24 secured to the other end thereof for sweeping over the outer face of the disc 12. Preferably, a diametric counterbalancing extension 26 is provided on the pointer 24 and colored or shaped to differentiate from the latter. A plurality of spacer elements 28, 30, and 32 are secured on the spindle 20 between the discs 10, 12, and mounted on the spindle between the spacer elements 30 and 32 and in frictional engagement therewith is a toothed wheel 34 constituting a part of a clockwork escapement mechanism 36. A coil spring 38 constituting another part of the escapement mechanism 36 is in coaxial spaced relation to the escape wheel 34 and has its inner end fastened to the spindle 20 and its outer end fastened to a stud 40 on one of the discs 10, 12. An anchor pallet 42, which also constitutes a part of the escapement mechanism and engages with the escape wheel 34, is fastened to a second spindle 44 journalled in the discs 10, 12 in spaced parallel relation to the spindle 20. The axes of the two spindles 20 and 44 and the center of gravity of the weight 16 all lie in a common plane. A pendulum bob 46 is also secured to the second spindle.

The face of the disc 12 swept by the pointer 24 is provided with a circular scale 48, the number of divisions 50 on which correspond to the number of teeth on the escape wheel 34. A stop 52 projecting beyond the peripheral outline of the discs 10, 12 serves to set the initial amplitude with which the tester is set in motion. The stop 52 is counterbalanced by a weight (not shown) secured between the discs 10, 12 diametrically opposite the stop.

The spring 38 may be wound up and the pointer 24 moved to a zero position on the scale 48 by turning the spindle 20 counterclockwise, as viewed in Figure 1, by means of the knob 22. During this manual turning of the spindle 20, the frictionally-mounted escape wheel 34 remains stationary because of its engagement with the pallet 42. The spring 38 then applies a torque to the spindle 20, which torque is insufficient to overcome the frictional engagement of the wheel 34 with the spindle, so that the spindle will turn only as released tooth-by-tooth by oscillation of the pallet 42. It thus will be seen that, if the pendulum bob 46 swings relative to the tester with greater than a critical amplitude, determined by the relationship between the pallet 42 and the escape wheel 34, the spindle 20 and consequently the pointer 24 will rotate in a clockwise direction, as viewed in Figure 1.

Figure 2:
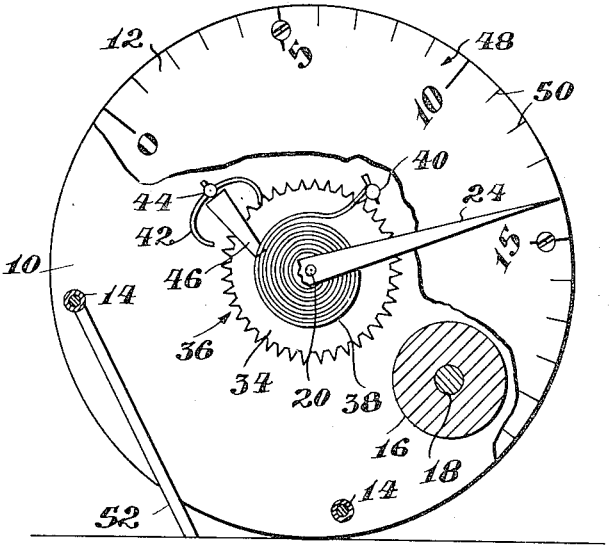
Figure 2 is a view corresponding to Figure 1, but with the tester shown in position to start its oscillation with a predetermined initial amplitude.

To use the tester to measure the hardness of a surface, the spring 38 is wound up until the pointer 24 is zeroed on the scale 48, and the tester is placed on the surface, tilted or rocked to the limit determined by the stop 52, as shown in Figure 2, and then released. As the tester oscillates, the pendulum bob 46 tends to hang vertically, and, because of its resulting oscillating movement relative to the tester, actuates the escapement mechanism 36 to release the escape wheel 34 tooth-by-tooth. Hence, with each oscillation of the tester, the escape wheel 34 rotates through a distance corresponding to one tooth and the pointer 24 records the number of such movements on the scale. The recording continues until the amplitude of oscillation of the tester has decreased to a limit beyond which the amplitude of the relative movements between the tester and the pendulum bob 46 is insufficient to actuate the escapement mechanism. The position of the pointer 24 on the scale 48 then indicates the number of oscillations made by the tester between two predetermined amplitudes, such number being a measure of the hardness of the surface on which the instrument is positioned.

Other means for setting the tester in motion with a predetermined initial amplitude may be used. For example, the tester may be provided with a spirit level indicator (not shown) mounted at an angle on the tester, the instrument being tilted until the indicator is level and then released. Still another motion-initiating means may take the form of a magnetic starter (not shown) consisting of an electromagnet provided with grooved pole pieces. To set the tester in motion, the starter is placed on or near the surface under measurement, the tester is placed on the surface, the magnet is switched on, and the tester is tilted until one of the spacer bars, made of ferromagnetic material, is positioned in the grooves of the magnet pole pieces. The tester is then released by switching off the magnet.

It thus will be seen that the objects of this invention have been fully and effectively accomplished. It will be realized, however, that various changes may be made in the specific embodiment shown and described for the purpose of illustrating the principles of this invention without departure from such principles. Therefore, this invention includes all modifications encompassed within the spirit and scope of the following claims.

I claim:

1. In a hardness tester of the type adapted to rock on a level surface to be tested and having curved bearing surfaces for engaging such level surface, the combination of means mounted on the tester and responsive to oscillations thereof of greater than a predetermined low amplitude for counting the number of oscillations of the tester in which the amplitude decreases from an initial predetermined high to said predetermined low.

2. In a hardness tester of the type adapted to rock on a level surface to be tested and having curved bearing surfaces for engaging such level surface, the combination comprising: a pendulum-actuated clockwork escapement mechanism mounted on the tester and operable by oscillations thereof of greater than a predetermined low amplitude; and means driven by said mechanism for counting the number of oscillations of the tester in which the amplitude decreases from an initial predetermined high to said predetermined low.

3. The structure defined in claim 2 including an oscillation-limiting stop on the tester for determining the initial high amplitude of oscillation.

4. In a rocker-type hardness tester having circular bearing surfaces for engaging a level surface to be tested and an eccentric weight to cause oscillation of the tester, the combination comprising: a first spindle journalled on the tester coaxially with its bearing surfaces; a coil spring having one end thereof connected to said spindle and the other end thereof connected to the tester; means for winding up said spring to exert a turning torque on said spindle; an escapement mechanism including an escape wheel on said spindle, a second spindle journalled on the tester in parallel spaced relation to said first spindle, an anchor pallet rigidly carried by said second spindle and cooperable with said escape wheel, and a pendulum bob rigidly secured to said second spindle; an indicator arm on the end of said first spindle; and oscillation-counting indicia on the tester swept by said arm and corresponding in number to the number of teeth on said escape wheel.

5. The structure defined in claim 4 including a counterbalanced stop on the tester for determining an initial high amplitude of oscillation thereof.

6. The structure defined in claim 4 wherein the plane of the axes of the spindles includes the center of gravity of the eccentric weight.

7. The structure defined in claim 4 wherein the indicator arm is counterbalanced.

8. In a rocker-type hardness tester having curved bearing surfaces for engaging a level surface to be tested and an eccentric weight to cause oscillation thereof, the combination comprising: a pendulum-actuated clockwork escapement mechanism mounted on the tester and operable by oscillations thereof of greater than a predetermined low amplitude, said mechanism including an escape wheel and a pendulum-actuated anchor pallet having their axes lying in a diametric plane which includes the center of gravity of the eccentric weight; and indicator means driven by said escape wheel for counting the number of oscillations of the tester in which the amplitude decreases from an initial predetermined high to said predetermined low.

References Cited in the file of this patent

UNITED STATES PATENTS

| 694,652 | Kuhn | Mar. 4, 1902 |
| 902,497 | Landgraf et al. | Oct. 27, 1908 |
| 1,935,752 | Sward | Nov. 21, 1933 |